INVENTOR
G. P. PASTERNACK
BY E J Olinder
ATTORNEY

United States Patent Office 3,441,682
Patented Apr. 29, 1969

3,441,682

MULTIFREQUENCY SIGNAL RECEIVER WITH COMPENSATION FOR POWER SOURCE VARIATIONS

Gerald P. Pasternack, Scotch Plains, N.J., assignor to Bell Telephone Laboratories, Incorporated, New York, N.Y., a corporation of New York Filed May 28, 1965, Ser. No. 459,651
Int. Cl. H04m *1/00*
U.S. Cl. 179—84 12 Claims

ABSTRACT OF THE DISCLOSURE

A signal receiver for detecting oscillatory signals within a preselected frequency band employs a transistor biasing circuit to compensate for changes in receiver bandwidth that would otherwise be caused by variations in the voltage level of the power source.

This invention relates to multifrequency signaling systems and, more particularly, to multifrequency signal receivers.

Multifrequency signaling systems typically employ coincident tone bursts coded in terms of frequency for the transmission of signaling information. Such signals may be generated by pushbutton telephone subsets, for example. One illustrative system of this type is described by L. Schenker in the January 1960 issue of the Bell System Technical Journal, 39 BSTJ 35.

In most telephone systems currently employing multifrequency or TOUCH-TONE signaling, conventional central office equipment is modified to include an adapter type of receiver that converts each tone pair into D-C signals. Appropriate combinations of these D-C signals are employed to initiate the operation of central office switching equipment to complete the desired connections. A receiver of this general type is shown in United States Patent 3,076,059, issued to L. A. Meacham and L. Schenker on Jan. 29, 1963.

A similar type of multifrequency signaling receiver is utilized in so-called key telephone systems which may include key telephone subsets that generate multifrequency or TOUCH-TONE signals and other subsets that generate conventional D-C signals. A receiver of this type is shown in application Ser. No. 240,601, filed Nov. 28, 1962, by G. E. Brumfield, C. E. Morse and J. C. Smith. Such receivers are typically located on the premises of the subscriber rather than at a central office and, accordingly, operating conditions are less closely controlled. For example, wider variations in power supply level must be accepted than is the case in central office installations.

In prior art multifrequency receivers, particularly in receivers of the latter type, the maintenance of fixed receiver bandwidths is dependent upon a relatively fixed level of supply voltage. As a result, the reliability of such receivers is adversely affected owing to the acceptance by the receiver of spurious out-of-band input signals that may be caused by noise or speech, for example. Although it is of course possible to stabilize power supplies within closely controlled limits, this approach to the problem is costly and also adds to circuit complexity.

Accordingly, one object of the invention is to enhance the reliability of multifrequency signal receivers.

Another object is to simplify detector circuits in multifrequency signal receivers.

A further object is to reduce the effect of power supply variations on the effective bandwidth of multifrequency signal receivers.

These and other objects are achieved, in accordance with the principles of the invention, by a multifrequency signal receiver wherein each of the channel detector circuits includes a means for uniquely compensating for the effect of variations in the voltage level of the power source to the end that the effect of such variations on the effective bandwidth of the receiver is eliminated or substantially reduced. Specifically, in accordance with the invention, each of the detector circuits employs a first transistor with a tuned circuit input. The output of the input transistor is applied to the base of a second or output transistor. The emitter-collector path of the output transistor is a part of the power supply path for an output device, which may be a relay, for example. It is evident that in such an arrangement, any variation from the nominal level of the voltage of the relay power supply, such as an increase for example, will directly effect the effective bandwidth of the receiver inasmuch as the relay will operate even though the base of the output transistor is driven by a relatively weak signal on the edge of, or slightly out of, the desired receiver bandwidth. It is of course desired to have each relay operate only in response to an input signal that falls within a precisely defined bandwidth.

The principles of the invention call for the utilization of a unique means of biasing the input transistor from the power supply source of the output relay. Specifically, a bias voltage is applied to the emitter of the input transistor by a suitably proportioned voltage divider network to the end that a change in supply voltage, such as an increase for example, tends to reduce the effective bandwidth of the receiver thus compensating for the reverse effect that is brought about by an increase in the relay voltage supply. With a reduction in supply voltage, a compensating action opposite to that described will occur.

Accordingly, one feature of the invention pertains to a detector in a multifrequency receiver, including a means for compensating for the change in effective receiver bandwidth that would normally occur as the result of variations in power supply voltage.

Another feature of the invention relates to the utilization of a common power supply for a detector output relay and for the biasing supply of an associated transistor control circuit wherein the application of biasing voltage is controlled by a suitably proportioned voltage divider circuit to the end that a change in the nominal voltage level of the power supply has little or no effect on effective receiver bandwidth.

These and other objects and features will be fully apprehended from the following detailed description of an illustrative embodiment of the invention and from the appended drawing in which.

Figure 1:
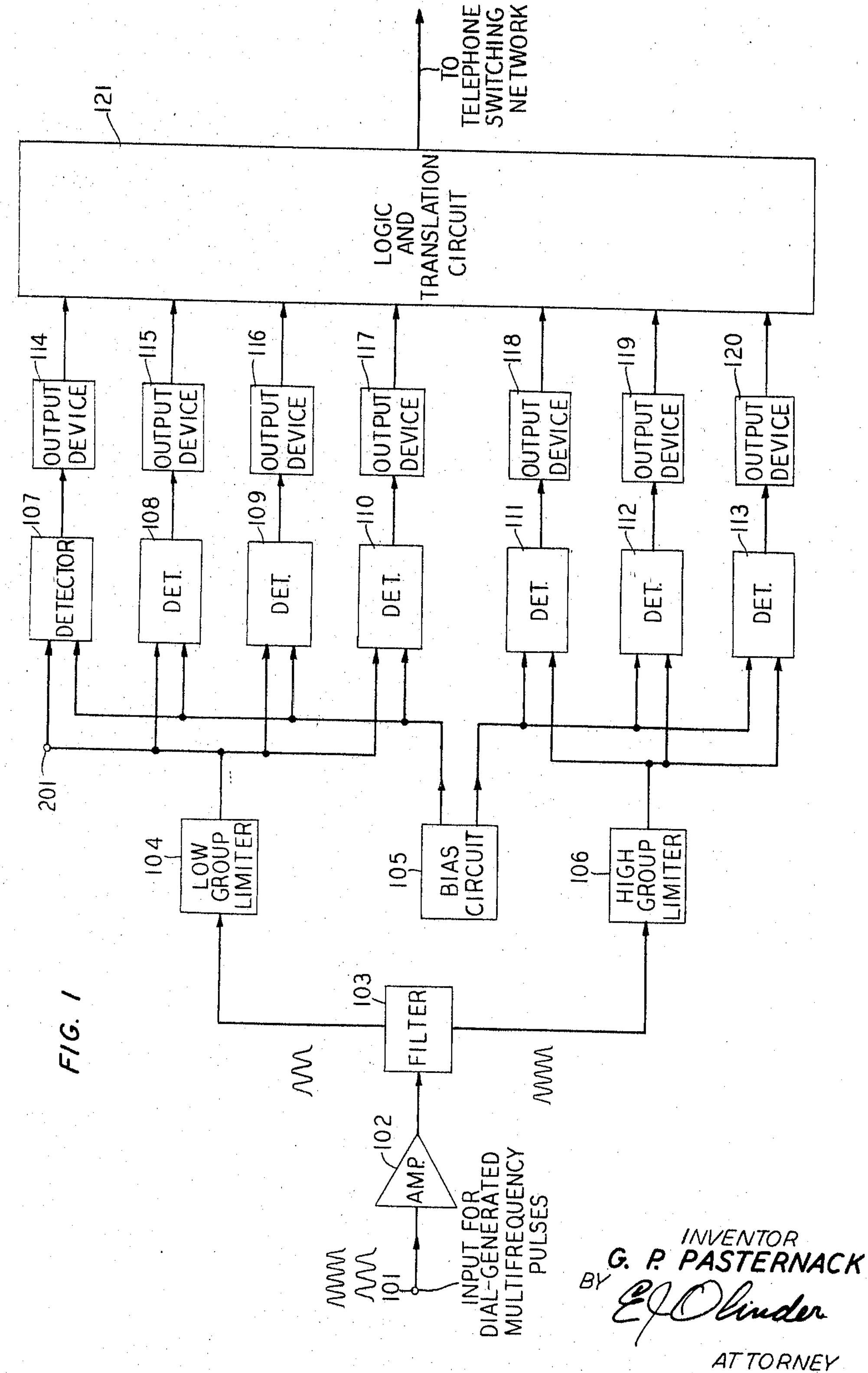
FIG. 1 is a block diagram of a multifrequency receiver in accordance with the invention.

As shown in block diagram form in FIG. 1, in a receiver in accordance with the invention, input signals in the form of multifrequency tone bursts are applied to input point 101 and amplified by amplifier 102. A filter 103 separates the signals into two groups or bands. Low frequency band signals are applied to group limiter 104 and high frequency band signals are applied to group limiter 106. The output of each of the limiters 104 and 106 is a square wave containing the fundamental and odd harmonics of the dominating frequency component of the signal. The output of limiter 104 is applied as an input to detectors 107 through 110, and the output of limiter 106 is applied as an input to detectors 111 through 113. A common bias supply 105 is used for each of the detectors 107 through 113. Each of the detectors 107 through 113 is tuned to respond to a respective one of seven frequencies, or, more specifically, each detector responds to signals falling within a respective relatively narrow signal bandwidth that is centered about a respective center frequency.

The operation of any of the detectors 107 through 113 results in the operation of a corresponding one of the output devices 114 through 120. Output devices 114 through 120 may be relays, for example. In this manner, a valid incoming signal consisting of two frequencies results in the operation of one output device in the low group, i.e., output devices 114 through 117, and one output device in the high group, i.e., output devices 118 through 120.

The operation of the output devices is converted by a translation circuit 121 from the 3 x 4 code to a one-out-of-ten code, which may then be utilized in conventional fashion to operate an electromechanical switching network. Suitable filters, group limiters and translation circuits for a receiver of the general type shown in FIG. 1 are well known in the art, being shown, for example, by L. A. Meacham and Leo Schenker in Patent 3,076,059, issued Jan. 29, 1963, and by F. T. Boesch, D. H. Nash and L. Schenker in Patent 3,128,349, issued Apr. 7, 1964. The principal concepts of the instant invention lie in the specific circuitry employed in the combination of the detectors and bias supply.

Figure 2:
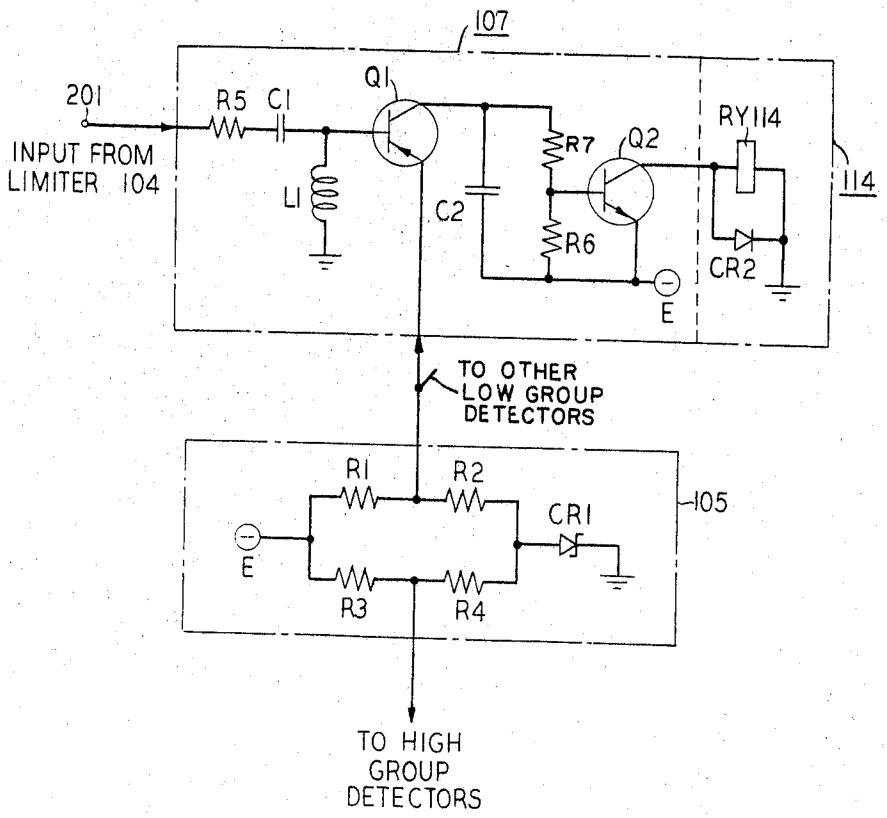
FIG. 2 is a schematic circuit diagram of one of the detectors, the bias circuit and one of the output devices shown in block form in FIG. 1.

Detailed circuitry for the combination of detector 107, bias circuit 105 and output device 114, in accordance with the invention, is shown in schematic circuit form in FIG. 2. This combination is illustrative of like combinations formed by each of the detectors 108 through 113, with corresponding ones of output devices 115 through 120 and with bias circuit 105. As shown, detector circuit 107 includes a tuned circuit comprising resistor R5, capacitor C1 and inductor L1, which is utilized to apply input signals from input point 201 to the base of transistor Q1. Bias for transistor Q1 is supplied to the emitter from power supply E by way of a biasing network which includes resistors R1 and R2 and diode CR1. When transistor Q1 operates in response to an input signal, its collector output is applied to the base of transistor Q2. The bias for transistor Q2 is supplied by power supply E. Voltage on the base of transistor Q2 is controlled by resistor R7 and resistor R6. Capacitor C2 acts as an integrator for the collector current pulse during the conduction of transistor Q1. Relay RY114 operates whenever sufficient power is supplied from the collector output of transistor Q2. A protective diode CR2 shunts relay RY114.

The maintenance of receiver reliability requires that relay RY114 operate in response to a particular band of frequencies, which may be some preselected frequency $f_0 \pm 1.5\%$, for example. In accordance with one of the aspects of the invention, the Q of the tuned circuit in the base circuit of transistor Q1 is adjusted so that the instantaneous A-C voltage on the base of transistor Q1 is negative during a portion of the voltage swing with respect to the bias voltage applied to the emitter of Q1 *only* for the preselected frequency band. Under these circumstances, transistor Q1 will conduct. The angle of conduction, or period of conduction during each cycle, is a function of frequency, tuned circuit Q, and the relative levels of peak A-C base, and D-C emitter bias voltages at transistor Q1.

As the center frequency $f_0$ is approached from either end of the frequency spectrum, there are two input frequencies, one above $f_0$, and one below $f_0$ at which relay RY114 just operates. The difference between these two "just operate" frequencies defines the channel's *bandwidth*. As the edge of band is approached, the peak A-C voltage at the base of transistor Q1 increases, the transistor Q1 conducts for a particular angle, this angle being dependent upon frequency for a fixed tuned circuit Q. Consequently, the collector current of transistor Q1 consists of a series of pulses, the width of these pulses being dependent upon frequency. Capacitor C2 acts to integrate the transistor Q1 collector current pulses and thereby supplies base drive to transistor Q2.

Because of the level and relatively small angle of capacitor C2's charging current at the edge of band frequency, transistor Q2 is not fully conductive during the entire signal interval, and thus its collector current is also made up of a series of pulses. Accordingly, the current through relay RY114 is not constant.

The component values C2, R7 and R6 control Q2's base drive time constant. These values are chosen so that near the edge of band frequency the pulsing collector current of Q2 goes from saturation to cutoff. The voltage across relay RY114 goes from zero to E, and the relay will "just operate" when the power developed across it reaches the "operate" value. The power across relay RY114 can be varied in two ways: by changing the signal frequency, and thus changing the conduction angle of transistor Q2; or by varying the supply voltage E. Herein lies the relation between the "just operate" frequency, or bandwidth, and supply voltage.

For a fuller understanding of the bandwidth-supply voltage relation described above, assume that the supply voltage is at its nominal value and that the frequency is adjusted to the edge of band. As the E is decreased (made more positive) the power at relay RY114 is no longer sufficient to operate the relay and the bandwidth decreases. Conversely, as E is increased (made more negative) the power supplied to the relay exceeds its "just operate" value, and the bandwidth increases. What is required to make bandwidth independent of E is a means of keeping the power delivered to relay RY114 relatively constant, as E is varied.

Such a means is provided in accordance with the principles of the invention by a bias supply for the emitter of transistor Q1 which is a function of the supply voltage E. More specifically, when E is made more positive and the bandwidth tends to decrease, owing to the reduction in power supplied to relay RY114, the bias supply is also made more positive, thus increasing the conduction angle of transistor Q1 and restoring the relay power to its nominal, just operate value. The converse is true when E is made more negative. Thus, if the dependence of bias upon supply is properly selected, the power supplied to the relay is maintained at a relatively constant level as E is varied, and bandwidth is made substantially independent of E.

In accordance with the principles of the invention, bias circuit 105 is supplied to the emitter of transistor Q1 in a unique fashion that serves to compensate for the described effect of changes in supply voltage on receiver bandwidth. Specifically, the emitter of transistor Q1 receives its negative bias by way of a voltage divider which includes resistors R1 and R2. As shown by plot 301 in FIG. 3, bias is a function of supply voltage. The relation is linear, which is to say that the bias voltage V is more negative for a −26 volt supply than for a −20 volt supply. The ratio of the resistance of resistor R2 to the combined resistance of resistors R1 and R2, acting in conjunction with the fixed Zener voltage drop across diode CR1, sets the variation in bias voltage about its nominal value for the known maximum variation in supply voltage which may be 6 volts, for example. The magnitude of resistor R1 is a selected value to account for the inherent variation in the breakdown voltage of diode CR1, which may be on the order of ±5%. It is clear from FIG. 3 that a variation in supply voltage between $V_1$ and $V_2$ results in a variation in bias between $v_1$ and $v_2$. The relation is shifted, however, by the introduction of diode CR1, with a reverse breakdown voltage of $v_d$, as shown by the plot 302, to the end that variations in supply voltage $V_1$ and $V_2$ are reflected by a lesser shift in bias voltage, namely, between bias voltage $v_3$ and $v_4$.

Figure 3:
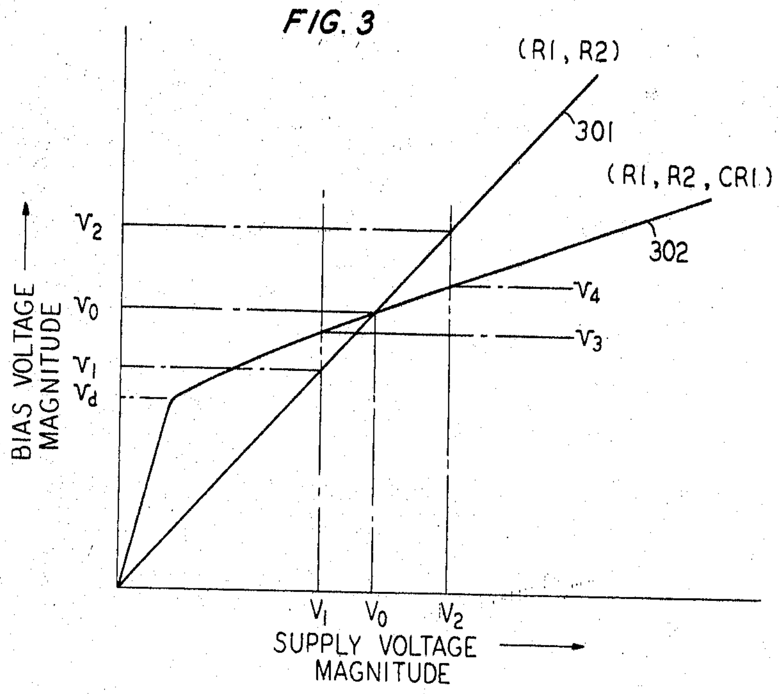
FIG. 3 is a plot of the bias vs. supply voltage characteristic of a receiver in accordance with the invention.
Figure 4:
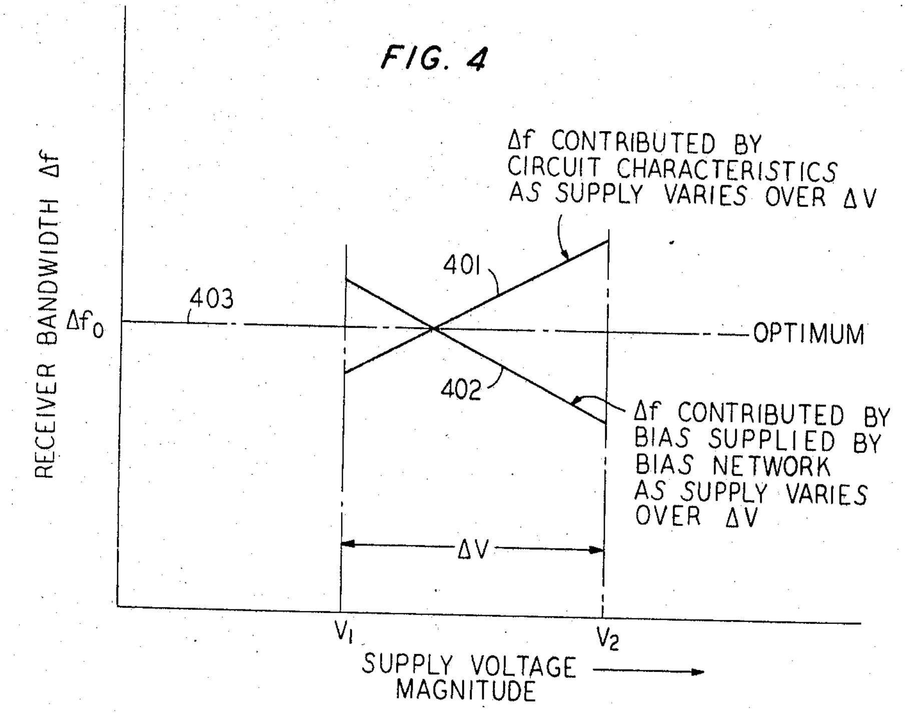
FIG. 4 is a plot of supply voltage vs. change in receiver bandwidth.

In accordance with the invention, the change in bias resulting from changes in supply voltage, as reflected by plot 302 in FIG. 3, is utilized to offset the shift in receiver bandwidth that would otherwise result from a change in supply voltage owing to the characteristics of the circuit, shown by plot 401 in FIG. 4. Stated otherwise, in accordance with the invention, the bias on transistor Q1 is made to vary as the level of voltage supply E varies, in accordance with a relation that is tailored by the characteristics of diode CR1 and by the resistance magnitude of resistors R1 and R2 to the end that the resulting change in receiver bandwidth $\Delta f$ is utilized, as shown by plot 402 in FIG. 4, to offset the reverse effect, shown by plot 401 in FIG. 4, so that some optimum value $\Delta f_0$ in receiver bandwidth is maintained. Consequently, the combined operation of the detector and the bias circuit, in accordance with the invention, is such that when the supply voltage is below its nominal level and the effective bandwidth tends to decrease, owing to the reduction in relay power, the bias voltage becomes less negative. This reduction in bias voltage allows the detectors to respond to a wider frequency range. As stated above, and as illustrated in FIG. 4, the net effect restores the channel bandwidth to its nominal value. Conversely, when the supply voltage is at its upper limit, the increase in bandwidth, brought about by the increase in relay power, is cancelled by a more negative bias voltage which, in effect, narrows the frequency range of detector operation. The receiver bandwidth is thus made virtually independent of changes in supply voltage.

It is to be understood that the embodiment described herein is merely illustrative of the principles of the invention. Various modifications may be effected by persons skilled in the art without departing from the spirit and scope of the invention.

What is claimed is:

1. A signal receiver for detecting oscillatory signals within a preselected frequency band comprising, in combination, a first transistor, means including a tuned circuit for applying an oscillatory input signal falling within said preselected band to the base of said first transistor, a second transistor, a relay, a source of D-C potential having a nominal level, means for applying the output of said first transistor to said second transistor thereby to control the conducting state of said second transistor, means including said second transistor connecting said source to said relay whereby departures of said D-C potential from said nominal level alter the effective bandwidth of said receiver, and means including said source for biasing said first transistor to compensate substantially for the bandwidth altering effect of said departures.

2. In a multifrequency signal receiver, in combination, input circuit means including a first transistor for detecting an oscillatory input signal within a preselected frequency band, a source of D-C potential of nominal level, an output circuit device, means connecting said first transistor to said device, said connecting means including means for applying said source to said device, whereby departures of said potential from said nominal level tend to reduce or increase the effective bandwidth of said receiver in accordance with the direction of said departure, and means including means for applying a biasing voltage to said first transistor from said source for substantially reducing the effect of said departures on said effective bandwidth.

3. Apparatus in accordance with claim 2 wherein said circuit device comprises a relay.

4. Apparatus in accordance with claim 2 wherein said source applying means comprises a second transistor and wherein said output circuit device comprises a relay.

5. Apparatus in accordance with claim 2 wherein said source applying means comprises a second transistor, wherein said output circuit device comprises a relay and wherein said connecting means further includes means for applying the output of said first transistor as a control input to said second transistor.

6. An oscillatory signal receiver comprising, in combination, a first transistor including base, emitter, and collector electrodes, a second transistor including base, emitter and collector electrodes, a relay, a source of D-C potential having a nominal level, means including a tuned circuit for applying oscillatory input signals to the base of said first transistor, means for applying an output from the collector of said first transistor to the base of said second transistor thereby causing said second transistor to conduct, means including the emitter-to-collector path of said second transistor for connecting said relay to said source, thereby causing said relay to operate, whereby departures of said source potential from said nominal level tend to change the effective bandwidth of said receiver in a direction related to the direction of said departure, and biasing means including said source for applying a biasing potential to the emitter of said first transistor, said last named potential having a magnitude and polarity that substantially compensates for said change in said effective bandwidth.

7. Apparatus in accordance with claim 6 wherein said biasing applying means comprises first resistance means, second resistance means and a Zener diode in series configuration between said source and a reference potential, said first and second resistance means having a common terminal, and means connecting said common terminal of said first and second resistance means to said emitter electrode of said first transistor.

8. Apparatus in accordance with claim 6 wherein said means for applying an output from the collector of said first transistor to the base of said second transistor includes first and second resistance means in series relation connected between said collector electrode of said first transistor and said source, said first and second resistance means having a first common terminal and said second resistance means and said source having a second common terminal, means connecting said base electrode of said second transistor to said first common terminal, means directly connecting said second common terminal to said emitter electrode of said second transistor, and a capacitive circuit element in shunt relation to said first and second resistance means.

9. A multifrequency signal receiver comprising, in combination, means for separating incoming oscillatory signals into high and low frequency bands, a first group of detector circuits each including means for detecting a signal of a respective frequency within said high frequency band, a second group of detector circuits each including means for detecting a signal of a respective frequency within said low frequency band, each of said detectors comprising, first and second transistors each having a base, emitter and collector electrode, a relay, a source of D-C potential, means including a tuned circuit for applying an oscillatory input signal to the base of said first transistor whereby an output signal appears on the collector of said first transistor, circuit means for applying an output from the collector of said first transistor to the base of said second transistor thereby causing said second transistor to conduct, means including the emitter-collector path of said second transistor connecting said source to said relay thereby to cause said relay to operate, variations of said potential from a nominal level being reflected in the degree of sensitivity of said relay to the conduction condition of said second transistor and, accordingly, being further reflected in a change in the effective bandwidth of said detector, and means including means for applying a biasing potential to the emitter of said first transistor from said source for compensating for said change in the effective bandwidth of said detector.

10. Apparatus in accordance with claim 9 wherein said compensating means comprises first and second resistance means and a Zener diode connected in series relation between said source and a source of reference potential and means connecting the common terminal of said resistance means to said emitter electrode of each of said first transistors in said first group.

11. Apparatus in accordance with claim 9 wherein said compensating means comprises first and second resistance means and a Zener diode connected in series relation between said source and a source of reference potential, means connecting the common terminal of said resistance means to said emitter electrode of each of said first transistors in said first group, third and fourth resistance means in series relation shunting said first and second resistance means and means connecting the common terminal of said third and fourth resistance means to said emitter electrode of each of said first transistors in said second group.

12. Apparatus in accordance with claim 9 wherein said circuit means includes first and second resistance means in series relation between said collector of said first transistor and said source and means connecting the common terminal of said first and second resistance means to the base of said second transistor.

References Cited

UNITED STATES PATENTS

| | | | |
|---|---|---|---|
| 3,060,275 | 10/1962 | Meacham et al. | |
| 3,080,528 | 3/1963 | Davidson ----------- | 330—22 |
| 3,143,602 | 8/1964 | Morrison et al. | |

KATHLEEN H. CLAFFY, *Primary Examiner.*

W. A. HELVESTINE, *Assistant Examiner.*